Oct. 16, 1923.
H. K. SANDELL
1,471,067
DYNAMO ELECTRIC MACHINE
Original Filed Aug. 8, 1917    2 Sheets-Sheet 1
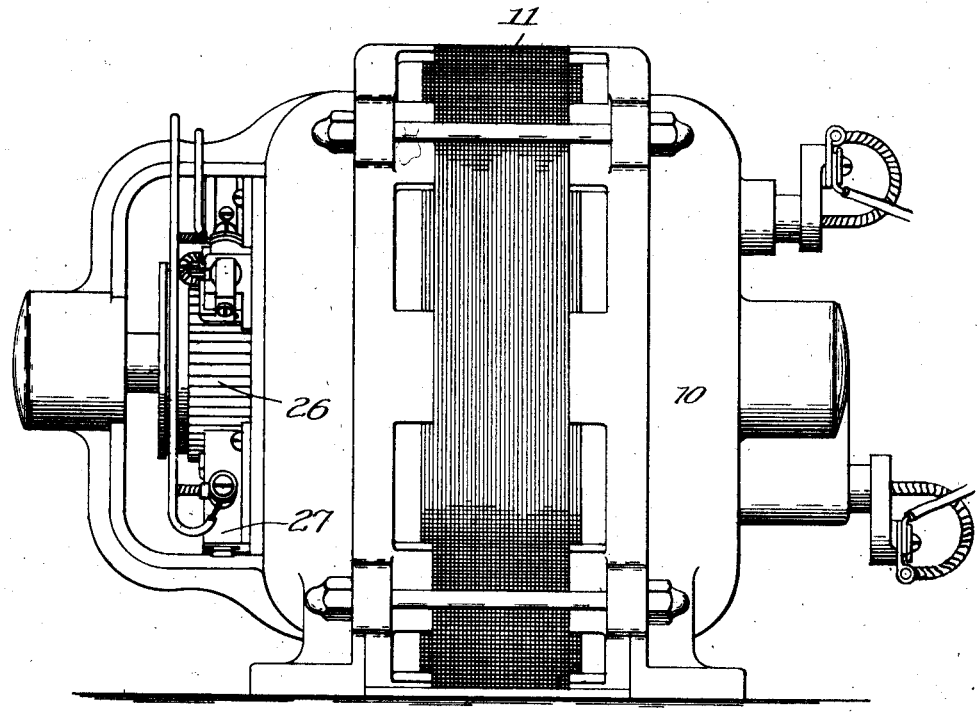
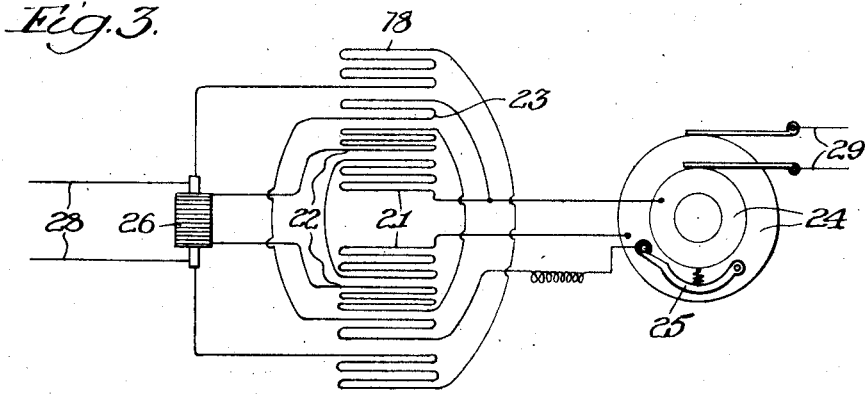
Inventor:
Henry K. Sandell, Oct. 16, 1923. 1,471,067
H. K. SANDELL
DYNAMO ELECTRIC MACHINE
Original Filed Aug. 8, 1917    2 Sheets-Sheet 2

Inventor:
Henry K. Sandell,
By Dyrenforth, Lee, Chritton & Wiles,
Attys.

Patented Oct. 16, 1923.

1,471,067

UNITED STATES PATENT OFFICE.

HENRY K. SANDELL, OF CHICAGO, ILLINOIS, ASSIGNOR TO HERBERT S. MILLS, OF CHICAGO, ILLINOIS.

DYNAMO-ELECTRIC MACHINE.

Original application filed August 8, 1917, Serial No. 185,009. Divided and this application filed February 12, 1919. Serial No. 276,565.

*To all whom it may concern:*

Be it known that I, HENRY K. SANDELL, a citizen of the United States, residing at 221 South Green Street, Chicago, in the county of Cook and State of Illinois, have invented a new and useful Dynamo-Electric Machine, of which the following is a specification.

This invention relates to improvements in dynamo electric machinery, and more particularly to such devices wherein alternating currents may be converted into direct currents and vice versa.

The objects of my invention are to improve the construction of dynamo electric machinery, more particularly that of the motor-generator type; to provide a machine having a single armature with independent alternating current and direct current windings and an additional alternating current starting winding; and to provide a single-armature combined synchronous single-phase motor and direct current generator. Other objects and advantages will be evident upon reading the present specification in connection with the drawing accompanying the same.

My invention is illustrated in its preferred embodiment as a self contained motor-generator or dynamotor in the accompanying drawings, in which—

Fig. 1 is a side elevation of a dynamotor or self contained motor generator constructed in accordance with my invention.

Fig. 3 is the diagram illustrating the wiring of the dynamotor.

Figure 2:
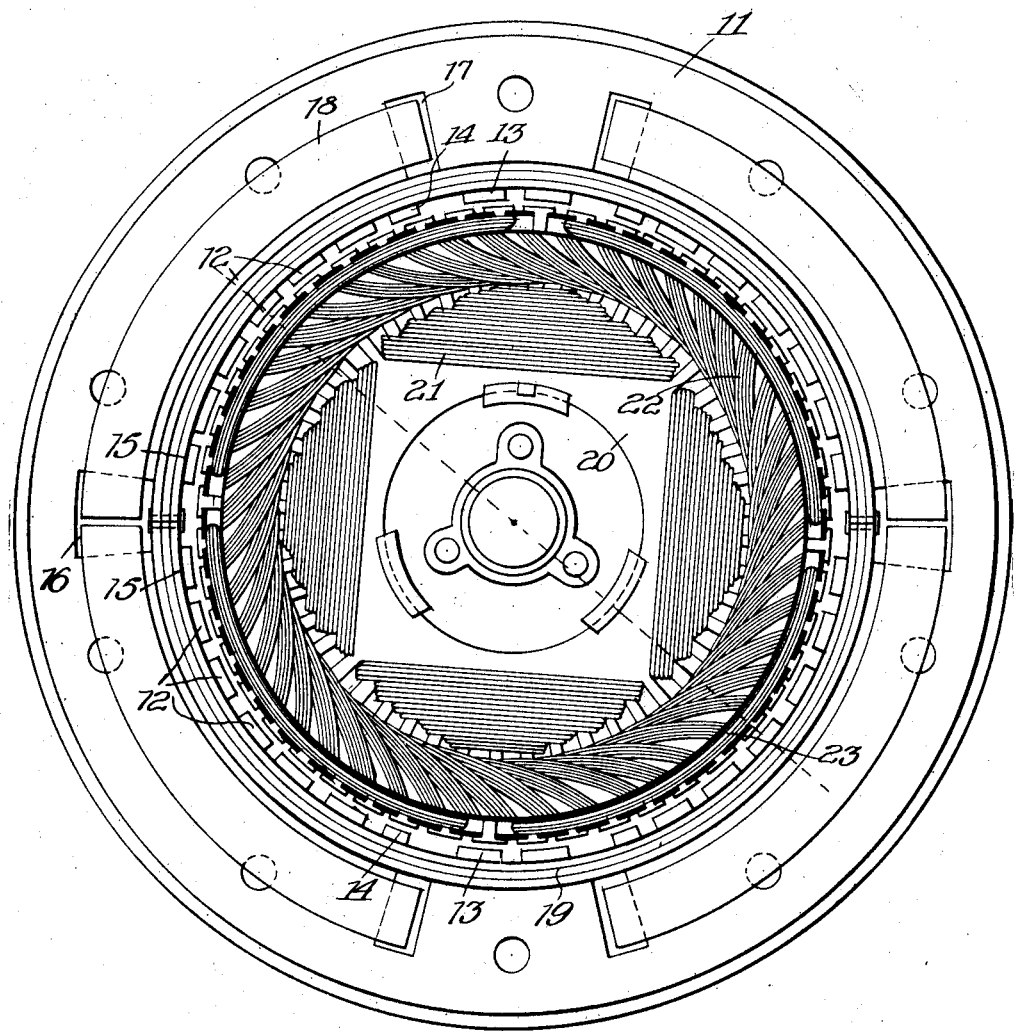
Fig. 2 is an end view thereof, the casing being removed.

In the embodiment of my invention illustrated in the drawings, the device operates as a synchronous motor on a single phase current and generates a direct current. It comprises a casing or housing 10, which carries or supports a stator 11. This stator I prefer to construct in accordance with the method described in my prior application, Serial No. 185,009, filed August 8th, 1917, of which this application is a division. The stator constructed in accordance therewith may be laminated in character, as shown in the present application, and has an even number of pole-teeth arranged in four identical groups, the individual pole-teeth in the group being of different angular amplitudes. As illustrated, each group may consist of a number, for example 5, of "normal" pole-teeth 12, a pole-tooth 13 at one end wider than the normal pole-teeth, a pole-tooth 14 adjacent thereto and narrower than the normal pole-teeth, and at the other end of each group a pole-tooth 15, also narrower than the normal pole-teeth. The group of poles and the synchronous field-winding may be relatively arranged as shown in Fig. 2, there being a wide slot 16 adapted to receive two windings outside an end pole-tooth 15 of each of the four groups and a narrow slot 17 adapted to receive one winding between an end pole-tooth 14 of each group and the adjacent pole-tooth 13. Four windings 18 are arranged in these slots. In the device illustrated there are thirty two individually unsymmetrical pole-teeth which are arranged in four symmetrical groups. There are also four unsymmetrically arranged synchronous field-windings. As described in my previous application, this arrangement of poles produces a condition which is not in balance and as a result of which, upon being energized the device may be started as an induction motor. Furthermore, by reason of the unsymmetrical arrangement of the synchronous field-winding, "hunting" is to a considerable extent prevented.

I may also provide the stator of my device with a laminated copper grid 19, the cross pieces of which extend between the pole-teeth of the stator.

In the embodiment illustrated this grid is similar to the so-called squirrel-cage winding in appearance although other forms may be employed if desired.

In the embodiment of my invention illustrated, the rotor or armature is wound as shown in Fig. 2 and in the wiring diagram of Fig. 3. The armature 20, having an even number of pole-teeth, shown in the drawings as 48, carries three distinct windings. Of these, one is an A. C. running winding, the second is a D. C. generator winding and the third is a split-phase A. C. starting winding. The A. C. running winding 21 lies nearest the center of the rotor or armature and is arranged to produce four poles, being of the concentric type. Immediately above the A. C. running winding 21 is the D. C. generator winding 22. Outside of the D. C. generator winding 22, and therefore substantially at the outer periphery of the armature is the A. C. split-phase starting winding 23. The A. C. running winding 21 is connected in the usual manner with slip-rings 24, the split-phase winding 23 being also connected with the slip-rings through a centrifugally operated cut-out switch 25. The D. C. generator winding is connected with a commutator 26, from the brushes of which the D. C. service line as well as the field winding 18 are energized. The form and arrangement of the various windings described is found to be particularly advantageous. The split-phase windings lying upon the surface of the armature give a high starting torque and interfere with the arrangement of the running windings to the smallest extent. The A. C. running windings are advantageously placed within the D. C. lap windings, this arrangement giving the maximum efficiency with the minimum structural complication.

In the construction shown, the D. C. brushes are held in position by suitable brush-holders 27. The D. C. service line is indicated as 28 and the A. C. service line as 29.

While I have shown and described in considerable detail one specific embodiment of my invention, it will be understood that this is for the purpose of illustration only and to render the invention more clear; and furthermore that I do not regard the invention as limited to these details nor to any of them except in so far as such limitations are included within the terms of the accompanying claim.

What I claim as new, and desire to secure by Letters Patent, is:

A dynamotor having a field magnet and an armature, a direct current winding on said magnet; an inductively excited winding also arranged on said magnet; a winding on the armature, arranged to provide armature poles whose angular spacing corresponds to that of the field poles; a second winding of an ordinary direct current type also disposed on said armature; and a third winding also disposed on said armature, said third winding being arranged to provide armature poles whose angular spacing corresponds to that of the field poles, but angularly displaced from the poles provided by the first mentioned winding, said third winding being disposed near the periphery of the armature; means for supplying single phase alternating current to the first and third windings and means to cut out the third winding on attainment of a desired rate of rotation.

HENRY K. SANDELL.